(12) United States Patent
Miller et al.

(10) Patent No.: US 6,789,392 B1
(45) Date of Patent: Sep. 14, 2004

(54) POWER INTERRUPT SYSTEM FOR A REFRIGERATED APPLIANCE

(75) Inventors: Alvin V. Miller, Swisher, IA (US); Joseph H. Ryner, New Windsor, IL (US); Kyle B. VanMeter, Galesburg, IL (US); Robert L. Wetekamp, Cedar Rapids, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/385,519

(22) Filed: Mar. 12, 2003

(51) Int. Cl.[7] ............................................. F25B 49/02
(52) U.S. Cl. ........................................ 62/130; 340/585
(58) Field of Search .......................... 62/125, 126, 127, 62/129, 130, 230; 340/585, 584, 587, 588, 589

(56) References Cited

U.S. PATENT DOCUMENTS

| | | |
|---|---|---|
| 3,063,235 A | 11/1962 | Winchell |
| 3,594,752 A | 7/1971 | Alton |
| 4,387,578 A | 6/1983 | Paddock |
| 4,490,986 A | 1/1985 | Paddock |
| 4,502,287 A | 3/1985 | Hare et al. |
| 4,647,223 A | 3/1987 | Fiddler |
| 4,707,684 A | 11/1987 | Janke et al. |
| 4,788,827 A | 12/1988 | Otani |
| 5,262,758 A | 11/1993 | Nam et al. |
| 5,337,575 A | 8/1994 | Ishihara |
| 5,924,295 A | 7/1999 | Park |
| 6,453,687 B2 * | 9/2002 | Sharood et al. ............ 62/127 |
| 6,481,224 B2 * | 11/2002 | Elwood et al. ............. 62/127 |
| 6,711,908 B2 * | 3/2004 | Ferragut et al. ............ 62/129 |

FOREIGN PATENT DOCUMENTS

JP          10300322          11/1998

* cited by examiner

Primary Examiner—Harry B. Tanner
(74) Attorney, Agent, or Firm—Diederiks & Whitelaw, PLC

(57) ABSTRACT

A refrigerated appliance includes a power interrupt system for detecting an out-of-range temperature condition in a fresh food or freezer compartment after a power interruption. The power interrupt system includes a central processor including a memory storage module and a plurality of temperature sensors. In operation, the power interrupt system compares sensed temperature values with stored temperature variables. If, after a power interruption, a compartment temperature exceeds a stored temperature variable by a defined amount, an over-temperature flag is triggered. Preferably, a display unit flashes an indication of the highest temperature reached by each compartment intermittently with the current compartment temperatures and an indication that a power interruption has occured. In this manner, a consumer can make an informed determination whether food stored within the appliance has been exposed to temperatures high enough to cause spoilage.

20 Claims, 4 Drawing Sheets

POWER INTERRUPT SYSTEM FOR A REFRIGERATED APPLIANCE

BACKGROUND OF THE INVENTION

1. Field of the Invention

The present invention pertains to the art of refrigerated appliances and, more particularly, to a refrigerated appliance having a system for detecting an over-temperature condition in a fresh food or freezer compartment resulting from an interruption of power to the appliance.

2. Discussion of the Prior Art

In general, refrigerated appliances include a freezer compartment for maintaining foodstuffs at or below freezing, and a fresh food compartment for maintaining foodstuffs in a temperature zone below ambient temperature but above freezing temperatures. A typical refrigerator includes an electrically powered refrigeration system having at least a compressor, a condenser, a condenser fan, an evaporator coil, evaporator fan and a plurality of temperature sensors.

In operation, a consumer selects a desired temperature for each of the fresh food and freezer compartments or, in the alternative, a preset temperature value is provided by the manufacturer. Once power is introduced to the appliance, the refrigeration system operates to establish and maintain the selected temperature within each of the fresh food and freezer compartments. During periods of normal use, each of the compartments is accessed several times during a typical day. Each time a compartment door is opened, the temperature inside the compartment rises due to an influx of warmer, ambient air. Sensors arranged within the compartments function to detect any rise in temperature, and in response, the refrigeration system is actuated to return the affected compartment to the selected temperature. Certainly, if the compartment is sealed, the refrigeration system will operate for a short time period in order to re-establish the selected temperature level. However, if the compartment remains open, i.e. the consumer fails to properly close a compartment door, the refrigeration system will operate continuously in order to try to maintain the proper temperature level.

Obviously, with the door open, no matter how efficient the refrigeration system, the temperature of the compartment will not reach the desired level. The warmer, ambient temperature will enter and raise the temperature of the unsealed compartment. Left unchecked, the temperature could rise to a level that would detrimentally affect food stored within the appliance. In addition to problems associated with open appliance doors, compartment temperatures will rise during periods of power interruption.

When power is interrupted to the appliance, the refrigeration system is unable to function. Despite the existence of seals about the appliance which prevent the influx of air to the compartment, over time, ambient air will leak into the appliance. The temperature of the compartment will rise, and if power is interrupted for a prolonged period, food within the appliance will spoil. When power is returned, the refrigeration system will operate normally, pulling down the compartment temperature to the selected level. Left unaware, the consumer may inadvertently consume spoiled food items.

Therefore, based on the above, there exists a need in the art of refrigerators for a power interrupt system that provides an indication to a consumer of an over-temperature condition developed during periods of power interruption. Specifically, to a power interrupt system which will display to the consumer the highest temperature reached during the period of the power interruption so that an informed decision can be made as to the likelihood that the food stored within the appliance has spoiled.

SUMMARY OF THE INVENTION

The present invention is directed to an power interrupt system for a refrigerated appliance. More particularly, the power interrupt system is provided to detect an out-of-range temperature condition for fresh food and freezer compartments of the refrigerated appliance after the occurrence of a power interruption. In accordance with one form of the present invention, the power interrupt system includes a control unit having a temperature selector element, a central processor including a memory storage module, and a plurality of temperature sensors arranged about the appliance. The temperature sensors, in combination with the control unit, function to monitor fresh food and freezer compartment temperatures and activate a refrigeration system upon a sensed cooling demand. In operation, the power interrupt system compares sensed temperature values with stored temperature variables. If, after a power interruption, the sensed temperatures exceed the stored temperature variables by a predetermined amount, a power interrupt or over-temperature flag is triggered.

In accordance with another preferred form of the invention, a first variable set, defined by an interrupt temperature for each of the fresh food and freezer compartments, is stored in the memory module. Preferably, the interrupt temperature represents the lowest possible temperature setting for the respective refrigerator compartment. A second variable set, defined by a current set point temperature for each compartment, is also stored in the memory module. Upon activation, after sensing a power interruption and subsequent re-initialization of power to the appliance, the control unit begins monitoring the post power interrupt temperatures for the compartments. Each time the control unit scans post power interrupt temperatures for the compartments, the values obtained are compared to the values stored in the first and second variable sets. If the current post power interrupt temperature exceed the corresponding value stored in the first or second variable sets, an out of temperature range flag is triggered and a visual indication to this effect is displayed to the consumer.

In the most preferred form of the invention, the refrigerated appliance includes an exteriorly mounted control panel having an alpha-numeric display. Once the out-of-range temperature flag is triggered, an alarm indicating the over temperature condition is activated. In the most preferred form, the display flashes the out-of-range temperature value for a particular compartment intermittently with the current compartment temperature value. More specifically, the display is continuously updated such that the highest temperature value realized by the compartment is displayed to the consumer. In addition to the out-of-range temperatures, the display will provide the consumer with an indication that a power interruption has occurred. This can take the form of a flashing display, an audible signal, or a combination thereof. In this manner, the consumer can decide if the compartment temperature was elevated to a point that would necessarily result in spoilage to the food stored within the compartment. Preferably, the display will continue to flash the alarm until a reset button is manipulated, thus ensuring that the consumer was made aware of the alarm condition.

Additional objects, features and advantages of the present invention will become more readily apparent from the

DETAILED DESCRIPTION OF THE PREFERRED EMBODIMENT

Figure 1:
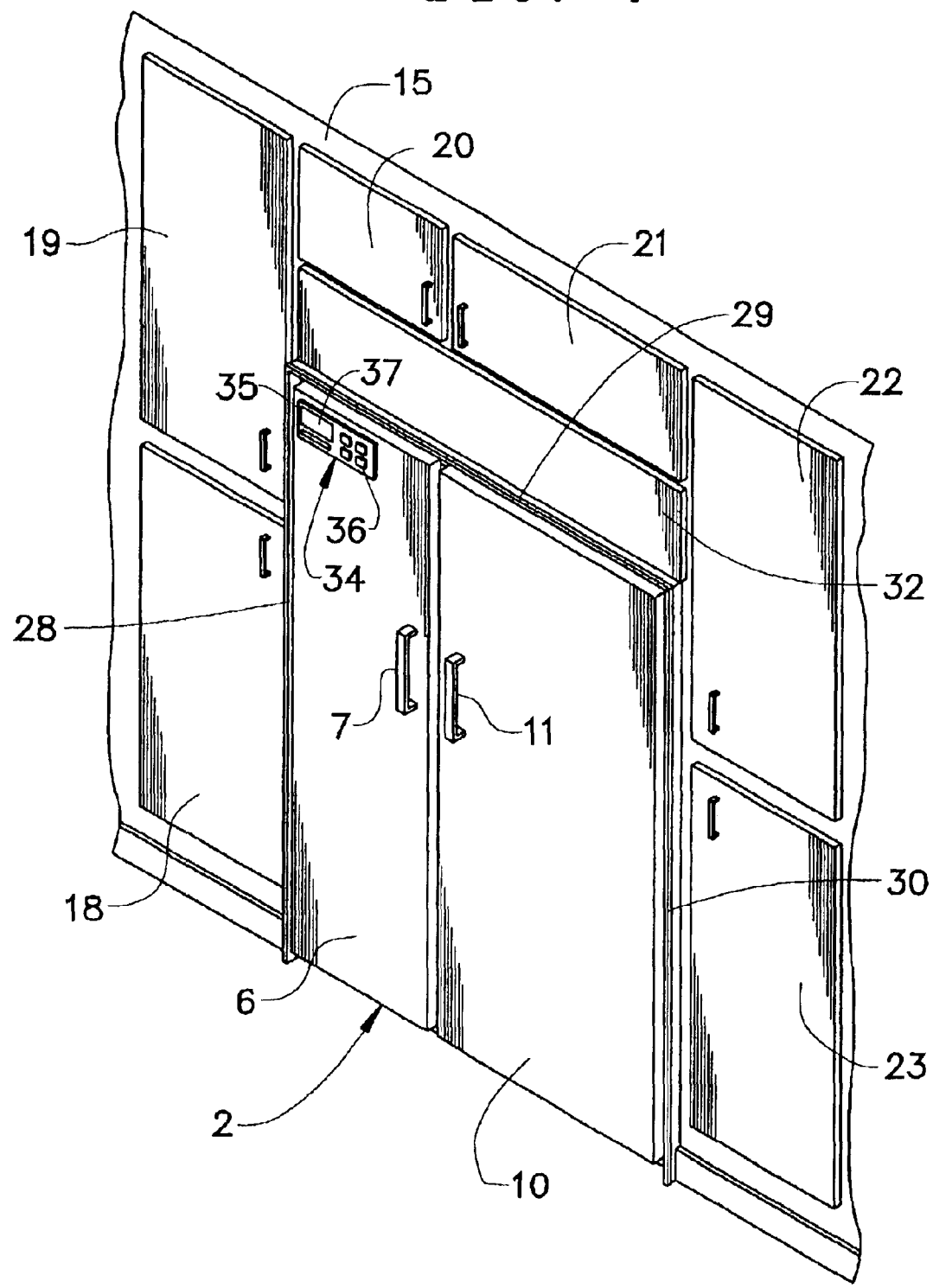
FIG. 1 is a front view of a refrigerated appliance employing the power interrupt system of the present invention.

With initial reference to FIG. 1, a refrigerator having a power interrupt system constructed in accordance with the present invention is generally indicated at 2. Refrigerator 2 is shown to include a freezer door 6 having an associated handle 7 and a fresh food door 10 having an associated handle 11. In the embodiment shown, refrigerator 2 is of the recessed type such that, essentially, only freezer and fresh food doors 6 and 10 project forward of a wall 15. The remainder of refrigerator 2 is recessed within wall 15 in a manner similar to a plurality of surrounding cabinets generally indicated at 18–23. Refrigerator 2 also includes a plurality of peripheral trim pieces 28–30 to blend refrigerator 2 with cabinets 18–23. One preferred embodiment employs trim pieces 28–30 as set forth in commonly assigned U.S. Patent Application entitled "Fastening System for Appliance Cabinet Assembly" filed on even date herewith and which is incorporated herein by reference.

In another preferred embodiment, refrigerator 2 is preferably designed with main components of a refrigeration system positioned behind an access panel 32 arranged directly above trim piece 29. In one preferred form of the invention, as will be detailed more fully below, a control and display unit 34 is mounted to an upper portion of freezer door 6. More specifically, control and display unit 34 constitutes an electronic control panel 35 having arranged thereon a plurality of control elements 36 to enter desired operating temperatures and a digital display 37 to show temperature set points and/or actual compartment temperatures. Preferably, control and display unit 34 includes consumer operated switches to change the displays from ° F to ° C and vise versa, various alarm indications, such as power interruption and door ajar indicators, service condition signals and, in models incorporating water filters, a filter change reminder.

Figure 2:
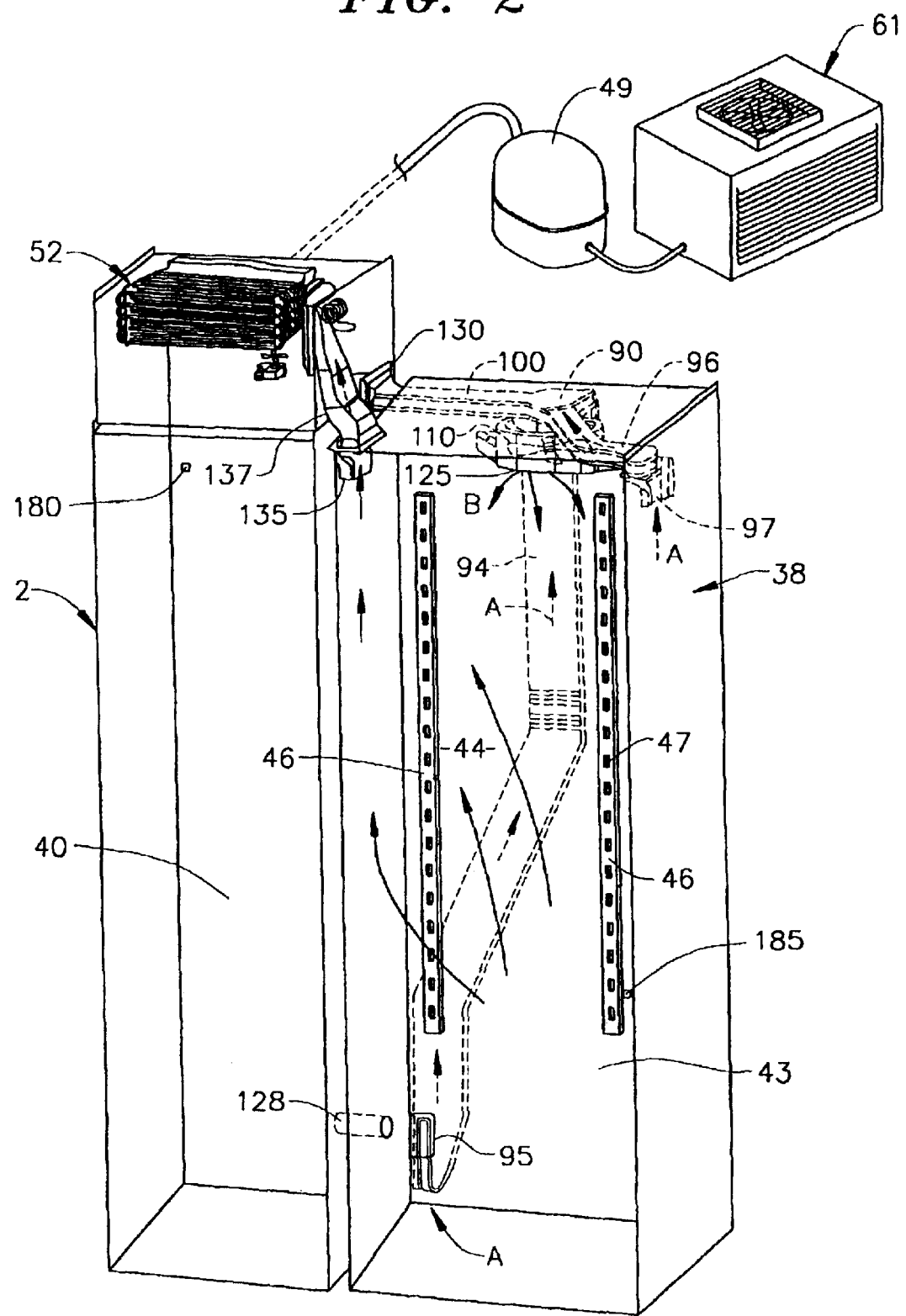
FIG. 2 is a partially exploded view showing various components of the power interrupt system of the present invention.

As shown in FIG. 2, refrigerator 2 includes a cabinet shell 38 defining a freezer compartment 40 and a fresh food compartment 43. For details of the overall construction of cabinet shell 38, reference is again made to the above-identified U.S. Patent Application entitled "Fastening System for Appliance Cabinet Assembly." Shown arranged on a rear wall 44 of fresh food compartment 43 are a plurality of elongated metal shelf rails 46. Each shelf rail 46 is provided with a plurality of shelf support points, preferably in the form of slots 47, adapted to accommodate a plurality of vertically adjustable, cantilevered shelves (not shown). Since the manner in which such shelves can be constructed and supported may vary and is not considered part of the present invention, the shelves have not been depicted for the sake of clarity of the drawings and will not be discussed further here. However, for purposes which will be set forth further below, it should be noted that each of rails 46 preferably extends from an upper portion, through a central portion, and down into a lower portion (each not separately labeled) of fresh food compartment 43.

In the embodiment shown, mounted behind access panel 32 are various components of the refrigeration system employed for refrigerator 2. More specifically, the refrigeration system includes at least a variable speed compressor 49, an evaporator 52 and a condenser 61. Preferably, each of the components is operated in an optimum manner based upon sensed cooling demand within refrigerator 2.

In addition to the aforementioned components, mounted to an upper portion of fresh food compartment 43 is an air manifold 90 for use in directing a cooling airflow through fresh food compartment 43 of refrigerator 2. More specifically, interconnected to air manifold 90 are a first recirculation duct 94 having an inlet 95 exposed in a lower portion of fresh food compartment 43, a second recirculation duct 96 having an inlet 97 exposed at an upper portion of fresh food compartment 43, and an intake duct 100 establishing an air path for a flow of fresh cooling air from freezer compartment 40 into manifold 90. Arranged in fluid communication with air manifold 90 is a fresh food stirring fan 110. Stirring fan 110 is adapted to receive a combined flow of air from recirculation ducts 94 and 96, as well as intake duct 100, and to disperse the combined flow of air into the fresh food compartment 43. With this arrangement, stirring fan 110 draws in a flow of air, which is generally indicated by arrows A, through inlets 95 and 97 of ducts 94 and 96, and intake duct 100, while subsequently exhausting the combined flow of cooling air, represented by arrow B, through an outlet 125. Most preferably, outlet 125 directs the air flow in various directions in order to generate a desired flow pattern based on the particular configuration of fresh food compartment 43 and any additional structure provided therein. The exact positioning of inlets 95 and 97 also depend on the particular structure provided. In one preferred arrangement, inlet 95 of duct 94 is located at a point behind at least one food storage bin (not shown) arranged in a bottom portion of fresh food compartment 43. The air flow past the storage bin is provided to aid in maintaining freshness levels of food contained therein. For this purpose, an additional passage leading from freezer compartment 40 into fresh food compartment 43 can be provided as generally indicated at 128. While not part of the present invention, the details of the storage bin are described in commonly assigned U.S. Pat. No. 6,170,276 which is hereby incorporated by reference.

In order to regulate the amount of cooling air drawn in from freezer compartment 40, a multi-position damper 130 is provided either at an entrance to or within intake duct 100. When the cooling demand within fresh food compartment 43 rises, damper 130 opens to allow cooling air to flow from freezer compartment 40 to fresh food compartment 43 and, more specifically, into intake duct 100 to manifold 90 and stirring fan 110. A flow of air to be further cooled at evaporator 52 is lead into an intake 135 of a return duct 137. In the embodiment shown, return duct 137 is preferably located in the upper portion of fresh food compartment 43. For details of the overall operation and arrangement of the temperature control system of refrigerator 2, reference is made to commonly assigned U.S. Patent Application entitled "Temperature Control System for a Refrigerated Compartment" filed on even date herewith and which is hereby incorporated by reference.

It should be understood that the above description is provided for the sake of completeness and that the present invention is particularly directed to a power interrupt system for refrigerator 2. More particularly, the power interrupt system detects an over-temperature condition and provides an indication of the highest temperature reached within either freezer compartment 40 or fresh food compartment 43 after a period of power interruption to refrigerator 2.

Figure 3:
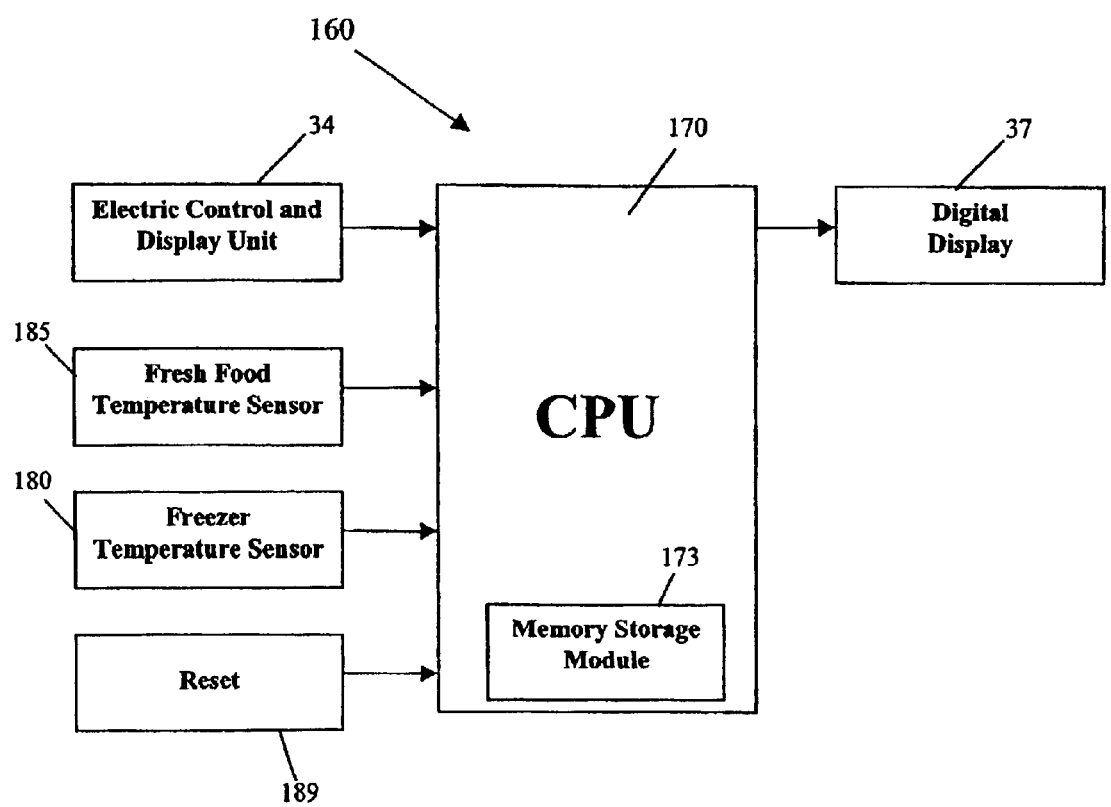
FIG. 3 is a block diagram depicting the interrelationship between components of the power interrupt system of FIG. 2.

Reference will now be made to FIG. 3 depicting a preferred embodiment of the present invention. As shown, a power interrupt system 160 includes a central processor or CPU 170 having a memory storage module 173. CPU 170 is adapted to receive input signals from control and display unit 34, in addition to a plurality of temperature sensors, two of which are constituted by a freezer temperature sensor 180 and a fresh food temperature sensor 185 (also shown in FIG. 2). Power interrupt system 160 is selectively activated through one of the plurality of control elements 36 on control and display unit 34. Upon activation, power interrupt system 160 monitors the temperature of freezer compartment 40 and fresh food compartment 43 after detecting a power interruption. Once power is restored to refrigerator 2 following a power failure, as will be detailed more fully below, power interrupt system 160 determines if the temperature of either freezer compartment 40 or fresh food compartment 43 exceeds a predetermined value. If so, power interrupt system 160 outputs to digital display 37 an indication of the highest temperature reached in each compartment until a reset button 189 is activated.

Figure 4:
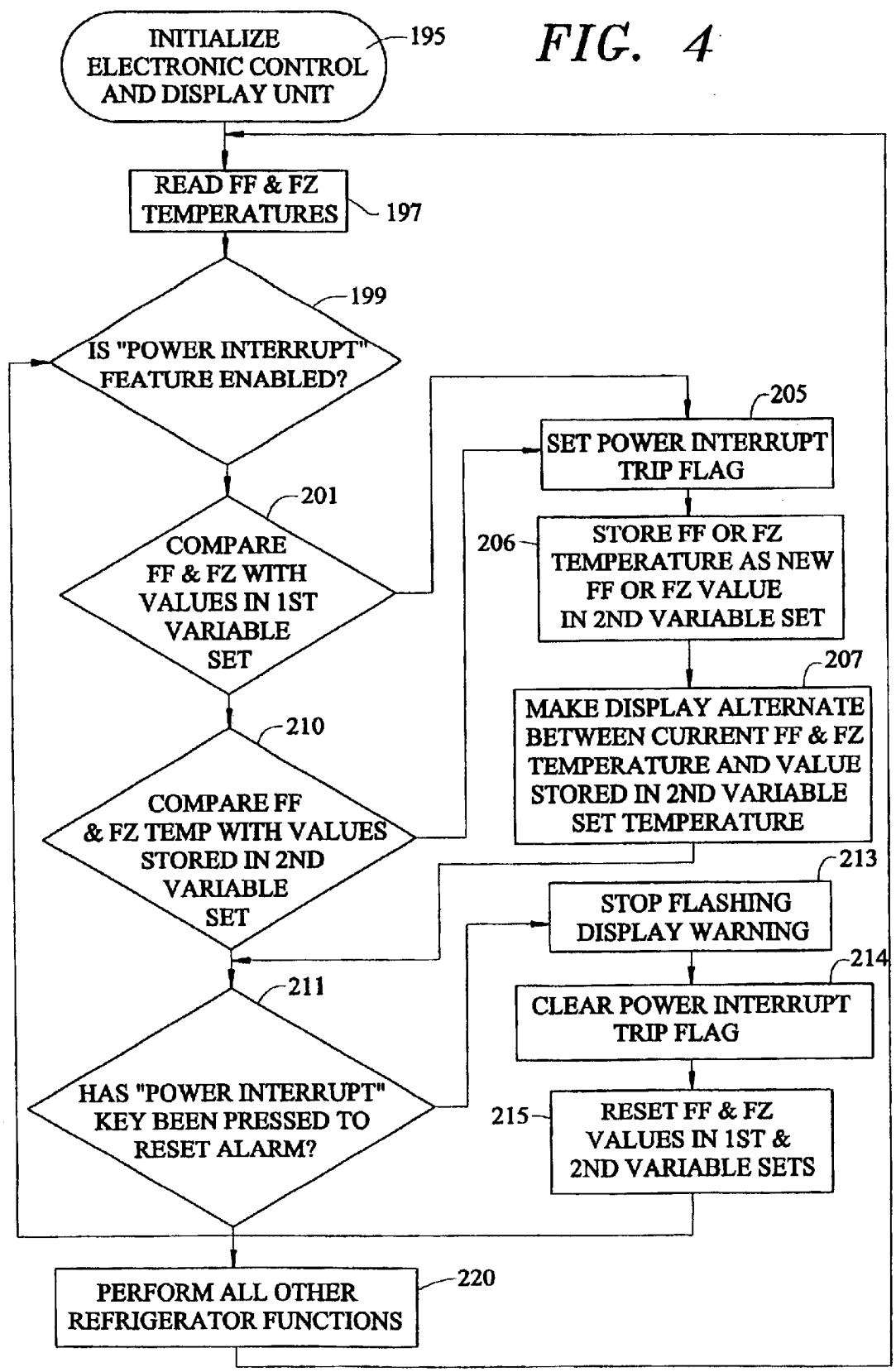
FIG. 4 is a flow diagram setting forth a preferred control algorithm for the method of operating the power interrupt system of the present invention.

Having described various of the components of power interrupt system 160, a preferred method of operation will be set forth with particular reference to FIG. 4 depicting a preferred control algorithm. Upon application of electrical power to refrigerator 2, control and display unit 34 and power interrupt system 160 are initialized in step 195. During the initial start-up sequence, a first variable set, defined by a value representing the respective set point temperatures for each of the freezer and fresh food compartments 40 and 43, is established. Simultaneously, a second variable set, defined by a value representing an interrupt temperature, is also established. In accordance with this preferred embodiment, the interrupt temperature values constitute the lowest possible temperature setting for each compartment. In any event, the respective variable sets are stored in memory storage module 173.

After an the initial power-up, be it through an initial application of power to the system or after a power interruption, temperature sensors 180 and 185 are polled in step 197 to determine current temperature values for both the freezer and fresh food compartments 40 and 43. After determining the current temperature values for the respective compartments, in step 199, a determination is made whether power interrupt system 160 is enabled. If, in step 199, power interrupt system 160 is determined to be enabled, then, in step 201, the current temperature value for each compartment is compared to the values stored in the first variable set.

If, after performing step 201, either the freezer or fresh food compartment temperatures are found to exceed the corresponding values stored in the first variable set by more than a first predetermined amount, preferably at least 3° F., a power interrupt or over-temperature trip flag is established in step 205. Once the over-temperature flag is enabled, the value stored in the second variable set, corresponding to the temperature values found to satisfy the requirement of step 201, is replaced with the new values in step 206. After the completion of step 206, the process moves to step 207 in which digital display 37 is caused to alternately flash a power interrupt signal, the current temperature of both the freezer and fresh food compartments 40 and 43 and the new value or values stored in the second variable set. In addition, an audible warning may accompany the visible warning provided by digital display 37. With this arrangement, the consumer is provided with an indication that a power interrupt has occurred and, additionally, the highest temperature reached by either compartment during the power interrupt, as well as current compartment temperatures.

Conversely, if in step 201 neither of the current temperature values sensed in step 197 exceeds the values stored in the first variable set by the predetermined value, the control algorithm moves to step 210 in which the current temperatures are compared to the values stored in the second variable set. In a manner similar to that described above, if the current temperature values exceed the values stored in the second variable set by a second predetermined amount, preferably at least 2° F., power interrupt system 160 performs steps 205–207.

In either case, digital display will continue to perform step 207 until, in step 211, it is determined that reset button 189, is actuated. After reset control 189 is actuated, signaling that the consumer is made aware of the power interrupt and any resulting rise in temperature, the control algorithm moves to steps 213–215 before terminating at step 220. In step 213 digital display 37 ceases to flash the warning established in step 207. Next, the power interrupt trip flag is disabled in step 214 and, finally, in step 215, the values stored in the second variable set are reset to the minimum set point temperatures establish at the onset of the process.

Although described with reference to a preferred embodiment of the invention, it should be readily understood that various changes and/or modifications can be made to the invention without departing from the spirit thereof. For instance, the particular location of the control and display unit is not important so long as it provides the consumer with a readily visible indication of the status of the appliance. Additionally, the particular temperature values that trigger the power interrupt system can be varied without departing from the scope of the present invention. Finally, while the refrigeration system is described as being operable with variable speeds, it should be understood that the power interrupt system of the present invention is applied to standard refrigeration systems as well. In general, the invention is only intended to be limited by the scope of the following claims.

We claim:

1. A method of detecting an over-temperature condition in fresh food and freezer compartments of a refrigerator after a power interruption comprising:

initializing, in a first variable set, values being defined by an interrupt temperature for each of the fresh food and freezer compartments;

setting a second variable set as the value of the current sensed temperature for each of the fresh food and freezer compartments;

detecting the power interruption and subsequent re-initialization of power to the refrigerator;

sensing a post power interrupt temperature for each of the fresh food and freezer compartments;

establishing the over-temperature condition if either the fresh food or freezer compartment post interrupt temperature exceeds the values established in either the first or second variable sets by respective predetermined amounts; and providing an indication when the over-temperature condition exists.

2. The method according to claim 1, wherein the interrupt temperature is defined by a lowest possible set point temperature for the fresh food and freezer compartments respectively.

3. The method according to claim 1, further comprising: establishing the over-temperature condition if either the fresh food or freezer compartment post power interrupt temperature exceeds the values of the first variable set by at least 3° F.

4. The method according to claim 1, further comprising: establishing the over-temperature condition if the post power interrupt temperature for either the fresh food or freezer compartment exceeds the value of the second variable set by at least 2° F.

5. The method according to claim 1, wherein providing the indication of the over-temperature condition comprises intermittently flashing a visual indication of the over-temperature condition on a display console.

6. The method according to claim 1, wherein providing the indication of the over-temperature condition comprises sounding an audible alarm.

7. The method according to claim 1, wherein providing the indication of the over-temperature condition constitutes providing a visual indication of the highest temperature reached within each of the respective fresh food and freezer compartments, resulting from the power interruption, on a display console.

8. The method according to claim 7, further comprising: displaying an indication of the current temperature within each of the respective fresh food and freezer compartments on the display console.

9. The method according to claim 1, further comprising: replacing the values in the first variable set with the respective post power interrupt temperatures.

10. The method according to claim 1, further comprising:

continuously monitoring each of the fresh food and freezer compartments for the occurrence of the over-temperature condition.

11. The method according to claim 1, further comprising: resetting the variables stored in the first and second variable sets.

12. A method of detecting an over-temperature condition in a refrigerator having fresh food and freezer compartments after a power interruption comprising:

initializing, in a first variable set, a value being defined by an interrupt temperature for at least one of the fresh food and freezer compartments;

setting a second variable set as a value of a current sensed temperature for the at least one of the fresh food and freezer compartments;

detecting the power interruption and subsequent re-initialization of power to the refrigerator;

sensing a post power interrupt temperature for the at least one of the fresh food and freezer compartments;

establishing the over-temperature condition if the post interrupt temperature exceeds the values established in either the first or second variable sets by respective predetermined amounts;

replacing the value in the first variable set with the post power interrupt temperature; and providing an indication of the over-temperature condition.

13. The method according to claim 12, wherein the interrupt temperature is defined by a lowest possible set point temperature for the at least one of the fresh food and freezer compartments.

14. The method according to claim 12, further comprising:

establishing the over-temperature condition if the post power interrupt temperature exceeds the value stored in the first variable set by at least 3° F.

15. The method according to claim 12, further comprising:

establishing the over-temperature condition if the post power interrupt temperature exceeds the value stored in the second variable set by at least 2° F.

16. The method according to claim 12, wherein providing the indication of the over-temperature condition comprises intermittently flashing a visual indication of the over-temperature condition on a display console.

17. The method according to claim 12, wherein providing the indication of the over-temperature condition comprises sounding an audible alarm.

18. The method according to claim 12, wherein providing the indication of the over-temperature condition constitutes visually displaying a highest temperature reached within the at least one of the fresh food and freezer compartments resulting from the power interrupt.

19. The method according to claim 12, further comprising:

continuously monitoring the at least one of the fresh food and freezer compartments for the occurrence of the over-temperature condition.

20. The method according to claim 12, further comprising: resetting the variables stored in the first and second variable sets.

* * * * *